United States Patent
Kopplin et al.

(10) Patent No.: US 8,832,208 B2
(45) Date of Patent: Sep. 9, 2014

(54) HANDLING OF AGGREGATE MAXIMUM BIT RATE BY POLICY AND CHARGE CONTROL

(75) Inventors: Dirk Kopplin, Ytterby (SE); Susana Fernandez Alonso, Madrid (ES); Maria Belóu Pancorbo Marcos, Madrid (ES)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 874 days.

(21) Appl. No.: 13/059,440

(22) PCT Filed: Aug. 18, 2009

(86) PCT No.: PCT/EP2009/060666
§ 371 (c)(1),
(2), (4) Date: Feb. 17, 2011

(87) PCT Pub. No.: WO2010/020637
PCT Pub. Date: Feb. 25, 2010

(65) Prior Publication Data
US 2011/0138066 A1      Jun. 9, 2011

Related U.S. Application Data

(60) Provisional application No. 61/089,626, filed on Aug. 18, 2008.

(51) Int. Cl.
| | |
|---|---|
| G06F 15/16 | (2006.01) |
| H04L 12/851 | (2013.01) |
| H04W 36/00 | (2009.01) |
| H04L 12/891 | (2013.01) |
| H04L 12/857 | (2013.01) |
| H04L 12/801 | (2013.01) |
| H04L 12/813 | (2013.01) |

(52) U.S. Cl.
CPC ............... *H04L 47/10* (2013.01); *H04L 47/24* (2013.01); *H04W 36/0016* (2013.01); *H04W 36/0066* (2013.01); *H04L 47/41* (2013.01); *H04L 47/2491* (2013.01); *H04L 47/14* (2013.01); *H04L 47/20* (2013.01)
USPC ........... 709/206; 709/203; 709/223; 709/224; 709/217; 709/204; 455/418; 455/419; 455/420

(58) Field of Classification Search
CPC ......... H04L 47/10; H04L 47/41; H04L 47/14; H04L 47/20; H04L 47/24; H04W 36/0016; H04W 84/045
USPC .................................. 709/203–207, 214–220
See application file for complete search history.

(56) References Cited

U.S. PATENT DOCUMENTS

2008/0130574 A1      6/2008  Nam et al.
2009/0316656 A1*    12/2009  Zhao et al. .................... 370/331

OTHER PUBLICATIONS

Nortel, et al. AMBR Handling During HO. 3GPP Draft: S2-060849 CR on Annex E on AMBR Handing During HO 2G3G to LTE; 3$^{rd}$ Generation Partnership Project (3GPP), Mobile Competence Centre; Sophia-Antipoirs Cedex, France; vol. SA WG2. Jan. 19, 2008.

(Continued)

*Primary Examiner* — Jude Jean Gilles

(57) ABSTRACT

A policy and charge control (PCC) architecture and method for handling access point name-aggregate maximum bit rate (APN-AMBR) subscription data that is associated with a subscriber regardless of whether the subscriber's User Equipment (UE) is located in an AMBR-capable access area such as an E-UTRAN or in an AMBR non-capable access area such as a 3G SGSN. The PCC architecture includes: (a) a policy server such as a PCRF that installs the APN-AMBR subscription data during an IP session establishment for the subscriber in the IP level convergence point and (b) an IP level convergence point that enforces the APN-AMBR subscription data for a lifetime of an IP session associated with the IP session establishment.

20 Claims, 7 Drawing Sheets

(56) References Cited

OTHER PUBLICATIONS

ZTE. Add Gateway Control and QoS Rules Reply Ack Message. 3GPP Draft; C3-060740: $3^{rd}$ Generation Partnership Project (3GPP), Mobile Competence Centre; Sophia-Antipolis Cedex, France; vol. CT WG3. May 12, 2008.

Nortel. Transfer of AMBR Between SGSN and MME. 3GPP Draft: S2-084768 CR on 23401 Transfer AMBR between SGSN and MME; $3^{rd}$ Generation Partnership Project (3GPP); Mobile Competence Centre; Sophia-Antipolis Cedex. France; vol. SA WG2. Jun. 18, 2008.

Research in Motion. Two Type Non-GBR AMBR & Non-GBR MBR QoS Mapping for I-RAT HO. 3GPP Draft S2-084867 CR 0466 for Two-Type AMBR MBR Mapping for I-RAT HO—TS23401: $3^{rd}$ Generation Partnership Project (3GPP), Mobile Competence Centre; Sophia-Antipolis Cedex, France; vol. SA WG2. Jun. 18, 2008.

Huawei. AMBR Handling During HO from Release 7 GERAN/UTRAN to E-UTRAN. 3GPP Draft; S2-080130; $3^{rd}$ Generation Partnership Project (3GPP), Mobile Competence Centre; Sophia-Antipolis Cedex, France; vol. SA WG2. Jan. 8, 2008.

* cited by examiner

HANDLING OF AGGREGATE MAXIMUM BIT RATE BY POLICY AND CHARGE CONTROL

CLAIMING BENEFIT OF PRIOR FILED U.S. APPLICATION

This application claims the benefit of U.S. Provisional Application Ser. No. 61/089,626 entitled "Handling of Aggregated Maximum Bit Rate by Policy and Charging Control" filed on Aug. 18, 2008 the contents of which are hereby incorporated by reference herein.

TECHNICAL FIELD

The present invention relates in general to the telecommunications field and, in particular, to a policy and charge control (PCC) architecture for handling access point name-aggregate maximum bit rate (APN-AMBR) subscription data that is associated with a subscriber regardless if the subscriber's UE is located in an AMBR capable access (i.e., E-UTRAN) or in an AMBR non-capable access (i.e., 3G SGSN).

BACKGROUND

The following terms and abbreviations are herewith defined, at least some of which are referred to within the following description of the prior art and the present invention. The reference to the "present invention" or "invention" used herein relates to exemplary embodiments and not necessarily to every embodiment that is encompassed by the appended claims.
3GPP Third Generation Partnership Project
AAA Authentication, Authorization and Accounting
APN Access Point Name
AMBR Aggregate Maximum Bit Rate
ARP Allocation and Retention Priority
BBERF Bearer Binding and Event Reporting Function
CDMA Code Division Multiple Access
DSL Digital Subscriber Line
EPC Evolved Packet Core
EPS Evolved Packet System
E-UTRAN Evolved Universal Terrestrial Radio Access Network
GBR Guaranteed Bit Rate
GC Gateway Control
GERAN GSM EDGE Radio Access Network
GPRS General Packet Radio Service
GSM Global System for Mobile Communication
GTP GPRS Tunneling Protocol
HPLMN Home Public Land Mobile Network
HSS Home Subscriber Server
IMS IP Multimedia Subsystem
IMSI International Mobile Subscriber Identity
IP Internet Protocol
IP-CAN IP-Connectivity Access Network
LTE Long Term Evolution
PCC Policy and Charging Control
PCEF Policy and Charging Enforcement Function
PCRF Policy and Charging Rules Function
PDG Packet Data Gateway
PDN Packet Data Network
PDP Packet Data Protocol
PGW Packet Gateway
PMIP Proxy Mobile IP
PSS Packet Switched Streaming
QoS Quality of Service
MME Mobility Management Entity
QCI QoS Class Identifier
RAN Radio Access Network
RAT Radio Access Technology
SDF Service Data Flow
SGSN Serving GPRS Support Node
S-GW Serving Gateway
SPR Subscriber Profile Repository
UE User Equipment
UTRAN Universal Terrestrial Radio Access Network Referring to FIG. 1 (Prior Art), there is shown a diagram of an exemplary telecommunications network 100 with a well known architecture that is used to help describe the APN-AMBR concept which was introduced in 3GPP TS 23.401 v8.1.0 "GPRS Enhancements for E-UTRAN Access" (Release 8) March 2008 (the contents of which are incorporated by reference herein). Those skilled in the art are familiar with the architecture and functionality of this exemplary telecommunications network 100. Thus, for clarity only the PCRF 102, PDN GW 104 (which includes PCEF 106), HSS 108, MME 110, S-GW 112, subscriber's UE 114 and a few other components which happen to be relevant to the APN-AMBR concept are described in detail herein while other well known components or entities like the E-UTRAN, SGSN, GERAN, UTRAN etc. are not described in detail within this document.

As discussed in 3GPP TS 23.401, the APN-AMBR is used to limit the aggregated bit rate that can be expected to be provided across all Non-GBR bearers and across all PDN connections of the same APN. The APN-AMBR is subscription information that is stored in the HSS 108. Similar to other subscriber data, the APN-AMBR subscription data is downloaded from the HSS 108 at attach and then sent to the PDN GW 104 (PCEF 106) through the MME 110 and the S-GW 112 at IP-CAN session establishment. The PCRF 102 consequently receives the APN-AMBR subscription data over either the Gx interface or an Gxx interface (not shown) depending on whether an on-path or an off-path model applies. The PCEF 106 enforces the APN-AMBR subscription data. At a later stage, the APN-AMBR subscription data may be modified due to an external event associated with the PCRF 102 or due to a modification of the APN-AMBR is the HSS 108. The APN-AMBR procedure is currently defined for E-UTRAN, GERAN, UTRAN access to the EPC. FIG. 1 (Prior Art) shows an architecture having both an AMBR capable access (i.e., EUTRAN) and an AMBR non-capable access (i.e., 3G SGSN).

Since the AMBR concept is only defined for 3GPP access, the previously used MBR per non-GBR EPS bearer (which contains only QCI and ARP parameters) process is no longer used for AMBR capable accesses. However, a non-GBR bearer in a non-AMBR capable access, for example in a non-3GPP access or 2G/3G access, still requires the MBR for a bearer set up. This current situation is in contrast with EPC's functionality to support mobility of a terminal 114 between a variety of accesses (fixed and mobile). In particular, this current situation is problematic because as a terminal 114 moves between different accesses then the policy enforcement schemes associated with the various bit rates for that terminal 114 may need to change. For instance, a problem can occur when a terminal 114 moves between CDMA and 3GPP or pre-Rel-8 and Ret-8 networks during which the different enforcement schemes of the different accesses may adversely affect user perception and service behavior.

Plus, the current situation makes it very challenging for operators to deploy a common policy framework which can support their particular business model regardless of the terminal's access (AMBR capable access or non-AMBR capable access). Several scenarios are discussed next where a business model is restricted by the current state of the art when the operator has policies on a volume or time threshold for a subscriber 116 that need to be enforced.

First example: An operator provides 10 Mbits/s internet access for a subscriber 116 regardless of access (assuming the operator offers different kinds of access) including a volume limit of 2 Gbytes. The operator imposes a bandwidth restriction to 1 Mbits for the subscriber 116 during the rest of a calendar period when the volume limit is reached. At the end of the calendar period the volume limit is reset and the internet access subscription is restored to 10 Mbits.

Second example: An operator allows different bit rates depending on access. For a DSL access the subscriber 116 has 20 Mbit/s, while for a LTE access the subscriber 116 has a bit rate that is limited to 10 Mbit/s. However, the volume limit for the subscriber 116 is 2 GBytes per month regardless of access. When the volume limit is reached then operator imposes bandwidth restrictions to 1 Mbits/s for the subscriber 116 during the rest of a calendar period. At the end of the calendar period, then the volume limit is reset and the internet access subscription is restored to the subscribed values.

Thus, it can be seen that there are several problems associated with the current state of the art where the APN-AMBR concept is only defined for 3GPP access. In summary, these problems are as follows:
1. Currently the standard does not define enforcement of AMBR for those accesses not supporting the AMBR concept.
2. At handover for an AMBR capable access to an non-AMBR capable access the policy roles may need to be translated to access specific ones and end user perception can be affected.
3. The current standardized solution does not support control of AMBR for business models like the ones that where described in the aforementioned two examples.
Note: The terms "AMBR" and "APN-AMBR" are used interchangeably in this document.

Accordingly, there has been and is still a need to address the shortcomings associated with the defining of the APN-AMBR concept for only 3GPP access. This need and other needed are addressed by the present invention.

SUMMARY

In one aspect, the present invention provides a PCC architecture and method that handles APN-AMBR subscription data which is associated with a subscriber regardless if the subscriber's user equipment is located in an AMBR capable access or in an AMBR non-capable access. The PCC architecture includes: (a) a policy server (e.g., PCRF) that installs the APN-AMBR subscription data during an IP session establishment for the subscriber in an IP level convergence point and (b) an IP level convergence point that enforces the APN-AMBR subscription data for a lifetime of an IP session associated with the IP session establishment.

In yet another aspect, the present invention provides a telecommunications network for handling APN-AMBR subscription data associated with a subscriber if the subscriber's user equipment is located in an AMBR capable access. The telecommunications network includes: (a) a BBERF; (b) an IP level convergence point (e.g., PCEF) that installs the APN-AMBR subscription data during an IP session establishment for the subscriber, where the IP level convergence point enforces the APN-AMBR subscription data for a lifetime of an IP session associated with the IP session establishment; and (c) a policy server (e.g., PCRF) during the IP session establishment subscribes to be notified by at least the BBERF and the IP level convergence point (e.g. PCEF) when there is an event trigger that indicates a change in the APN-AMBR subscription data associated with the subscriber, and when notified about the event trigger utilizes PCC signaling to send modified APN-AMBR subscription data to the IP level convergence point.

In still yet another aspect, the present invention provides an IP level convergence point (e.g., PCEF) that interacts with at least a policy server (e.g., PCRF) to handle APN-AMBR subscription data associated with a subscriber regardless if the subscriber's user equipment is located in an AMBR capable access or in an AMBR non-capable access. The IP level convergence point includes: (a) a processor; and (b) a memory that stores processor-executable instructions where the processor interfaces with the memory and executes the processor-executable instructions to: (1) install the APN-AMBR subscription data during an IP session establishment for the subscriber; and (2) enforce the APN-AMBR subscription data for a lifetime of an IP session associated with the IP session establishment.

In yet another aspect, the present invention provides a policy server (e.g., PCRF) that interacts with at least an IP level convergence point (e.g., PCEF) to handle APN-AMBR subscription data associated with a subscriber regardless if the subscriber's user equipment is located in an APN-AMBR capable access or in an APN-AMBR non-capable access. The policy server includes: (a) a processor; and (b) a memory that stores processor-executable instructions where the processor interfaces with the memory and executes the processor-executable instructions to: (1) subscribe to be notified when there is an event trigger that indicates a change in the APN-AMBR subscription data associated with the subscriber; and (2) when notified about the change in the APN-AMBR subscription data utilize PCC signaling to send modified APN-AMBR subscription data to the IP level convergence point.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 1:
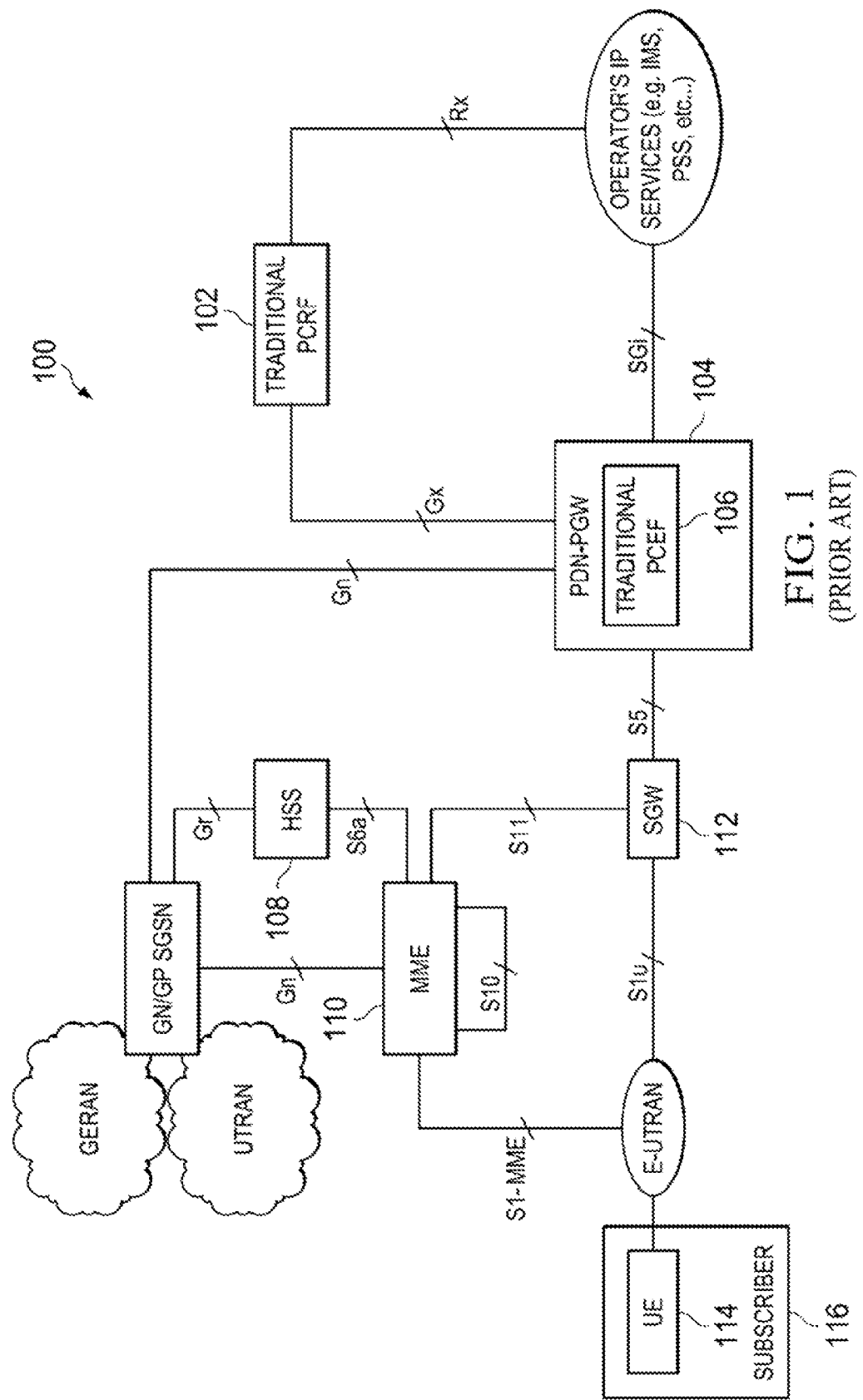
FIG. 1 (PRIOR ART) is a diagram of an exemplary 3GPP TS 23.401 telecommunications network which is used to describe the APN-AMBR concept and the problems associated with the state of the art that are addressed by the present invention.
Figure 2:
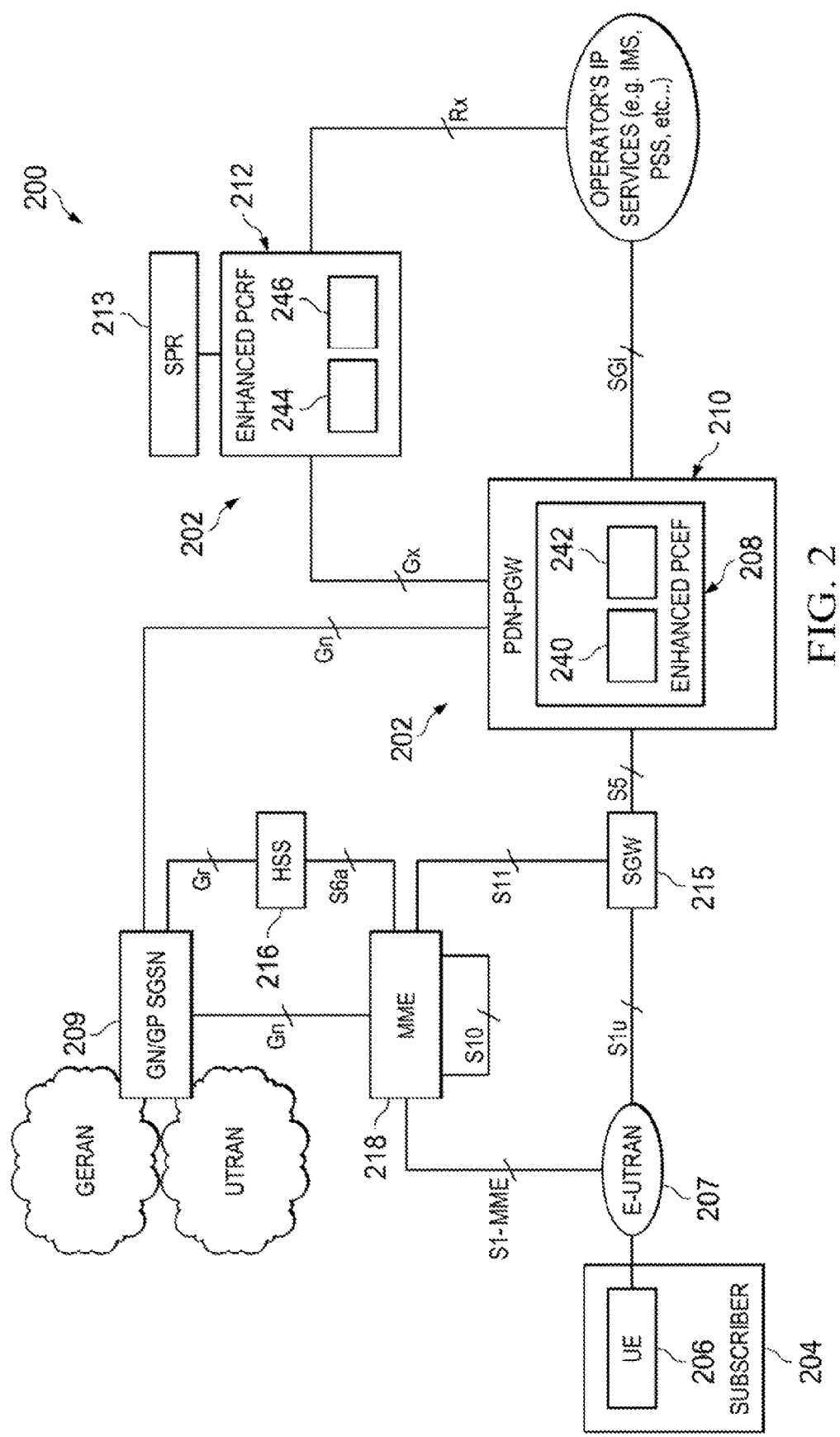
FIG. 2 is a diagram of an exemplary 3GPP TS 23.401 telecommunications network that has an enhanced PCC architecture in accordance with an embodiment of the present invention.

Referring to FIG. 2, there is shown a diagram of an exemplary telecommunications network 200 that is similar to the aforementioned telecommunications network 100 except that it includes an enhanced PCC architecture 202 in accordance with an embodiment of the present invention. The enhanced PCC architecture 202 is used to handle APN-AMBR subscription data associated with a subscriber 204 regardless if the subscriber's UE 206 is located in an AMBR capable access 207 (i.e., E-UTRAN 207) or in an AMBR non-capable access 209 (i.e., 3G SGSN 209). In this example, the PCC architecture 202 includes an IP level convergence point 208 (i.e., PCEF 208 located within the PDN GW 210), a policy server 212 (i.e., PCRF 212), and a database 213 (e.g., SPR 213). The SPR 213 (or HSS 216) stores the APN-AMBR subscription data. The PCEF 208 receives and installs the APN-AMBR subscription data during an IP session establishment for the subscriber's UE 206 and then enforces the APN-AMBR subscription data for a lifetime of an IP session associated with the IP session establishment. During the IP session establishment, the PCRF 212 also subscribes to be notified by the BBERF 214 (see FIG. 4) and the PCEF 208 when there is an event trigger that indicates a change in the AMBR subscription data associated with the subscriber 204. Once, the PCRF 212 is notified about a change in the APN-AMBR subscription data then an IP session modification is performed and the modified APN-AMBR subscription data is installed and enforced at the PCEF 208.

Basically, the concept of Aggregated Bandwidth Control using the PCC architecture 202 (PCC signaling) is introduced by the present invention. The PCC architecture 202 (PCC signaling) has the following features and advantages (for example):

1. It can be applied to all accesses including a fixed access and a mobile access which are connected to the PCC architecture 202.

2. It allows to apply the same bit rate enforcement policies when a terminal 206 (UE 206) moves from an AMBR capable access to an AMBR non-capable access 3. It can be handled entirely within the PCC architecture 202 without involving other entities outside the PCC architecture 202. Thus, the present solution is access agnostic.

4. Bandwith control is enforced in the anchor node for IP convergence (typically the PDN GW 210 and in particular the PCEF 208) regardless of the access.

The following scenarios describe some exemplary uses for the PCC architecture 202 that was not possible with the current state-of-the art. A. The first use case is when a terminal 206 (UE 206) moves from an AMBR capable access 207 to an AMBR non-capable access 209.

1. Terminal 206 attached in LTE (E-UTRAN 207).
   2. AMBR is provisioned from subscription data (typically HSS 216).
   3. AMBR is enforced in PDN GW 210.
   4. Terminal 206 moves to an AMBR non-capable access 209.
   5. PCC architecture 202 keeps AMBR enforcement, but may adjust AMBR according to user subscription. AMBR becomes a PCC parameter where the access does not need to support the AMBR concept.

B. The second use case is when a terminal 206 (UE 206) starts in an AMBR non-capable access 209 and moves to an AMBR capable access 207.

1. Terminal 206 attached in an AMBR non-capable access 209.
   2. AMBR is provisioned from a subscriber database (e.g., SPR 213) associated with the PCC architecture 202.
   3. AMBR is installed in the IP convergence node 208 (typically PCEF 208 located in PDN-PGW 210).
   4. Terminal 206 moves to a AMBR capable access 207.
   5. HSS APN-AMBR is provisioned to PCC architecture 202 during session management procedures.
   6. PCC architecture 202 may adjust AMBR to access policies during the session management signaling.

C. The third use case is when AMBR is temporarily changed due to time or volume based policies.

1. Terminal attached to 3GPP access 207.
   2. AMBR is installed in PCEF 208 according to subscription.
   3. Volume usage or time usage limits have been exceeded (measured in PDN-GW 210 and reported to the PCRF 212) causing an event trigger which is sent to PCRF 212.
   4. PCRF 212 changes AMBR according to policy rules and instructs PCEF 208 to enforce the changed AMBR. The changed AMBR does not need to trigger a session management procedure (e.g. the RAN (not shown) and the terminal 206 do not need to be involved). Instead, the changed AMBR can be handled within the PCC architecture 202.
   5. All SDF's to and from the terminal 206 are enforced according to the new AMBR.
   6. The PCRF 212 can at any point in time change the AMBR back to it's original values, given the reason for change does not apply any longer. The changes should not trigger a session management procedure i.e. not involve the terminal 206 or the RAN (not shown).

In these exemplary scenarios, it can be seen when the terminal 206 has an access that does not support the AMBR concept, the PCC architecture 202 can still enforce AMBR taking the access specific policies into account. Plus, the AMBR can be changed without involving adjacent nodes (only involving the policy server 212 (typically the PCRF 212) and the IP level convergence point 208 (typically PDN GW 210 that includes the PCEF 208). Moreover, the PCC architecture 202 allows the enforcement of operator policies without the need to update AMBR variants (UE/APN-AMBR) in other parts of the telecommunications network 200 (e.g. RAN, UE 206). Thus, the PCC architecture 202 enables the enforcement of temporary policy changes within a mobile broadband and mobility scenario to restrict the operator's subscribers 204 from overbooking their resources.

Figure 4:
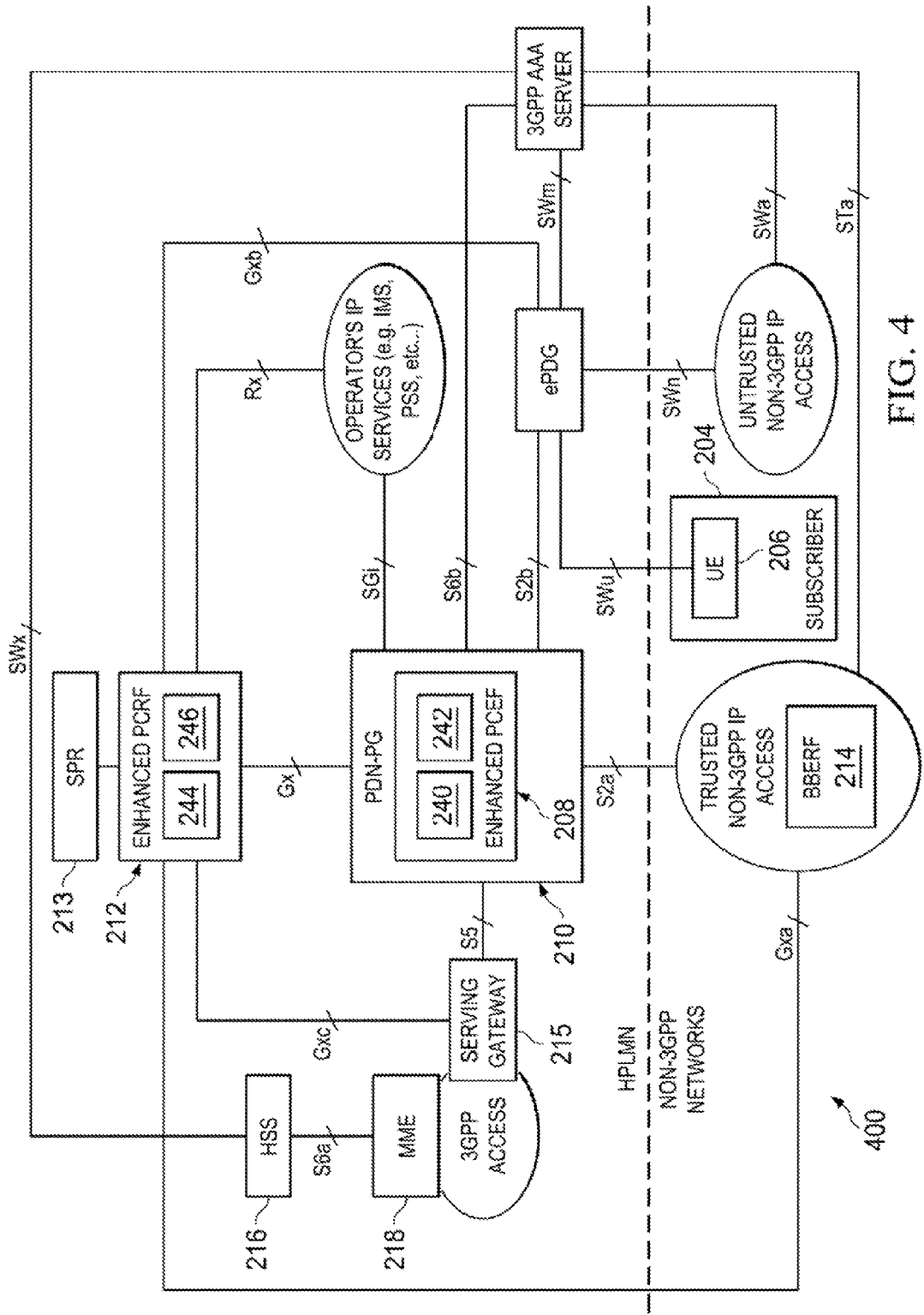
FIG. 4 is a diagram of an exemplary 3GPP TS 23.402 telecommunications network that has the enhanced PCC architecture in accordance with an embodiment of the present invention.

The PCC architecture 202 can implement the Aggregated Bandwidth Control by adding some features to the current Rel-8 procedures and in particular to the current 3GPP TS 23.203 v8.2.0, the current 3GPP TS 23.401 v8.1.0 (see FIG. 2), and the current 3GPP TS 23.402 v.8.1 (see FIG. 4). These features include additions to the IP-CAN session establishment procedure and the IP-CAN session modification procedure (BBERF-initiated, PCEF-initiated, and PCRF-initiated). In particular, the PCC architecture 202 requires the following additions to the current Rel-8 procedures:

IP-CAN session establishment and IP-CAN session modification procedure (both PCEF and BBERF-initiated) includes the AMBR being sent from the PCRF 212 to the PCEF 208. In addition for 3GPP access the APN-AMBR is sent from the BBERF 214 to the PCRF 212 when off-path model applies, then the PCRF 212 sends the AMBR to the PCEF 208 The off-path model refers to the situation where signaling does not follow the data path of the IP flow to be signaled. In this document, the off-path model requires that the both Gx and Gxx interfaces are deployed. On-path mode refers to the situation where signalling follows the data path of the IP flows to be signaled. In this document, the on-path model requires that the Gx interface is deployed.

PCRF-initiated IP-CAN session modification procedure includes the AMBR and PCC Rules being provisioned to the PCEF 208 from the PCRF 212. In addition, for 3GPP access the APN-AMBR is also provisioned to the BBERF 214 when off-path model applies.

PCEF-initiated IP-CAN session modification. PCEF 208 checks, after a RAT type change from E-UTRAN to UTRAN/GERAN if the QoS provided by the PCRF 212 is not the same as the QoS initially indicated in the Update Bearer Request, then if the QoS is not the same the session update procedures are executed to update the access and the UE 206 with the modified QoS.

A detailed discussion about how the PCC architecture 202 including the PCEF 206 and PCRF 210 can implement the Aggregated Bandwidth Control by making the aforementioned additions to the current Rel-8 procedures and enable the aforementioned use cases is provided below with respect to FIGS. 3-7.

Figure 3:
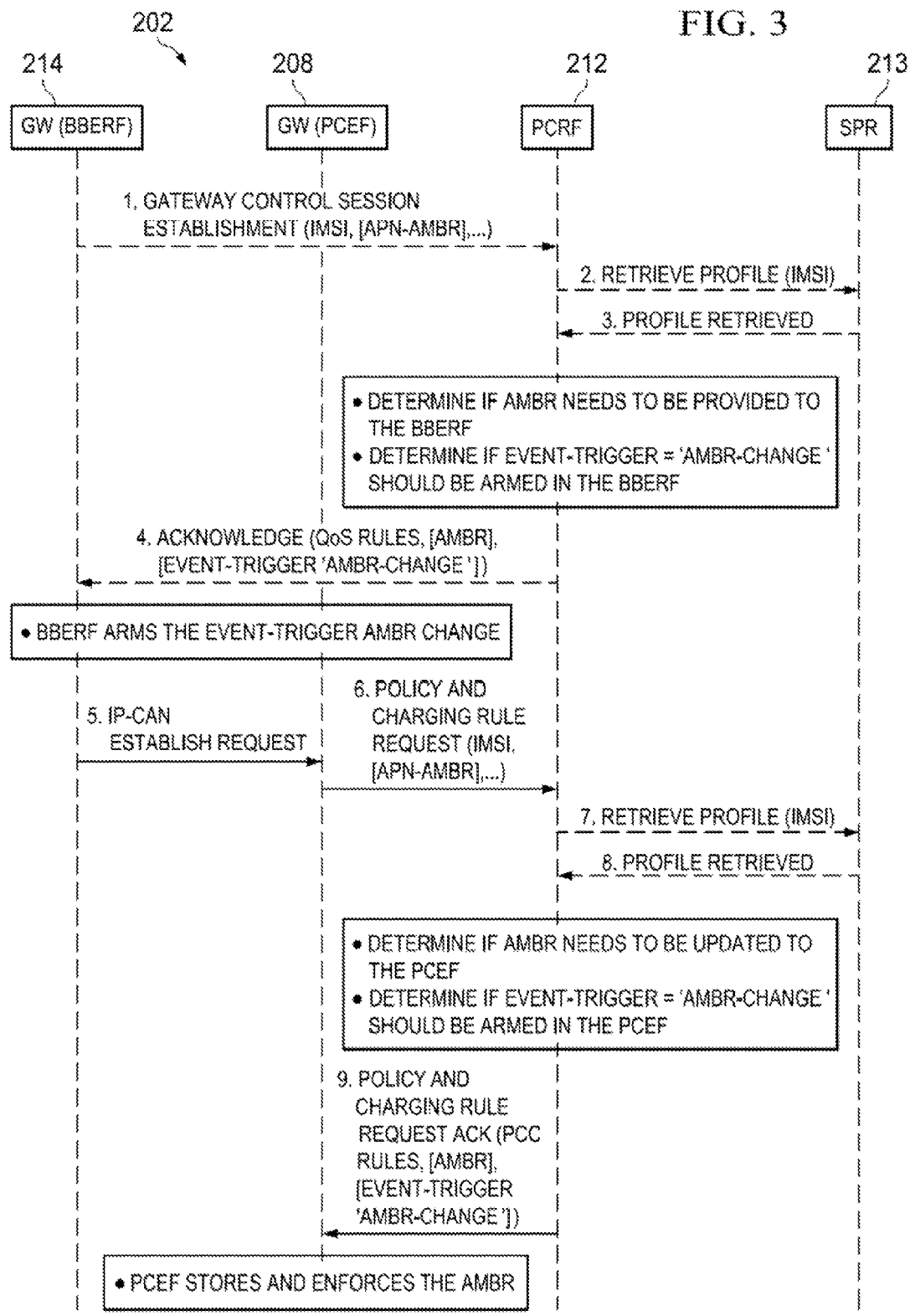
FIG. 3 is an information flow diagram which illustrates an IP-CAN establishment procedure which has been enhanced to include the APN-AMBR subscription data in accordance with an embodiment of the present invention.

Referring to FIG. 3, there is an information flow diagram which illustrates the IP-CAN establishment procedure which has been enhanced to include the APN-AMBR subscription data in accordance with an embodiment of the present invention. The information flow includes the following steps.

1*. BBERF 214 receives an indication that a gateway control session should be established for the subscriber 204, the subscriber's UE IMSI is received in the request. If the access supports AMBR, then the BBERF 214 also receives the APN-AMBR associated with the subscriber 204. The BBERF 214 sends a gateway control session establishment request to the PCRF 212 including at least the IMSI and if available the APN-AMBR. FIG. 4 illustrates a telecommunication network 400 that includes the PCEF 208, PCRF 212, SPR 213 and BBERF 214. The telecommunications network 200 shown in FIG. 2 does not require the BBERF 214.

2. PCRF 212 uses the IMSI received in the gateway session establishment request to retrieve the subscriber's profile from the SPR 213 (external database).

3. PCRF 212 installs the AMBR received from the SPR 213 if it is different from the APN-AMBR received from the BBERF 214. In addition, PCRF 212 determines if the AMBR needs to be provided to the PCEF 208. Plus, the PCRF 212 determines if the event-trigger "APN-AMBR-change" should be armed in the BBERF 214.

4. BBERF 214 receives an acknowledgement which contains QoS rules, possibly APN-AMBR and possibly event-trigger "APN-AMBR-change". BBERF 214 arms the event trigger 'APN-AMBR-change'.

5. BBERF 214 sends the PCEF 208 a request to establish an IP-CAN session.

6. PCEF 208 receives the request for an IP-CAN session establishment, and decides that PCC authorization is required. The PCEF 208 sends the UE's IMSI and if available the APN-AMBR in a PCC Rule Request to the PCRF 212.

7-8. If no subscriber information is available, the PCRF 212 retrieves the subscriber's information including the AMBR from the SPR 213. PCRF 212 determines if the AMBR needs to be updated to the PCEF 208. Plus, PCRF 212 determines if the event-trigger "APN-AMBR-change" should be armed in the PCEF 208. For instance, if the PCRF 212 determines that the PCEF 208 may identify changes in the AMBR, then the PCRF 212 subscribes to Event-trigger 'APN-AMBR-change' to the PCEF 208.

9. PCRF 212 sends a PCC Rule Request ACK including PCC rules, possibly AMBR, and possibly the event-trigger "APN-AMBR-change" to the PCEF 208. The PCEF 208 installs (stores) the AMBR and if requested arms the event-trigger "APN-AMBR-change". Then, the PCEF 208 enforces the AMBR.

*Note 1: This information flow diagram and the subsequent information flow diagrams all involve the use of the BBERF 214 which is not required to be in the 3GPP TS 23.401 telecommunications network 200 shown in FIG. 2. But, the BBERF 214 is located within a trusted non-3GPP access or an untrusted non-3GPP access associated with a telecommunications network having an architecture based on 3GPP TS 23.402 v8.1.0 "Architecture Enhancements for Non-3GPP Access" March 2008 (the contents of which are incorporated by reference herein). Thus, an exemplary 3GPP TS 23.402 telecommunications network 400 which includes the BBERF 214, PCEF 208, PCRF 212, and SPR 213 has been provided in FIG. 4. The present invention can be implemented in both the enhanced 3GPP TS 23.401 telecommunications network 200 and the enhanced 3GPP TS 23.402 telecommunications network 400 except that there will be no BBERF-initiated IP-CAN session modification associated with the enhanced 3GPP TS 23.401 telecommunications network 200. Furthermore, the present invention can be implemented in a wide variety of telecommunications networks that utilize the PCEF 208 and PCRF 212.

Note 2: When the subscriber's terminal 206 has an initial attach on non-3GPP networks that do not support AMBR, the PCEF 208 obtains the AMBR from the PCRF 212/SPR 213 (SPR 213 may be an external database). In contrast, when the subscriber's terminal 206 has an initial attach on 3GPP access that supports AMBR, then the PCEF 208 obtains the AMBR from the BBERF 214 via the MME 216. In particular, the HSS 216 downloads the AMBR (both APN-AMBR and UE-AMBR) to the MME 216 using the S6 interface, then at attach when the default bearer is created the MME 216 includes the APN-AMBR in the Create Bearer Request sent to the BBERF 214 (see 3GPP TS 23.401 v8.1.0).

After the IP-CAN session establishment, the AMBR is installed in the PCEF 208, and the PCRF 212 has subscribed to the event trigger 'APN-AMBR-change' to the BBERF 214 and/or to the PCEF 208. At this point, there are several situations that can result in an IP-CAN session modification (PCEF- or BBERF-initiated) that involves the APN-AMBR. These situations include (for example):

1. HSS-initiated AMBR change.
2. Handover from pre-Rel 8 GERAN/UTRAN to E-UTRAN or Rel-8 GERAN/UTRAN.
3. Handover from non-3GPP access to 3GPP access.

In these situations, the PCEF 208 (or the BBERF 214 for the off-path case) informs the PCRF 212 that a new event trigger "APN-AMBR-Change" has been detected. In addition, if the IP-CAN session modification is initiated by the BBERF 214 and the reason is BBERF relocation then the BBERF 214 may send the APN-AMBR subscription data to the PCRF 212. A detailed discussion is provided next about IP-CAN session modifications in accordance with the present solution.

Figure 5:
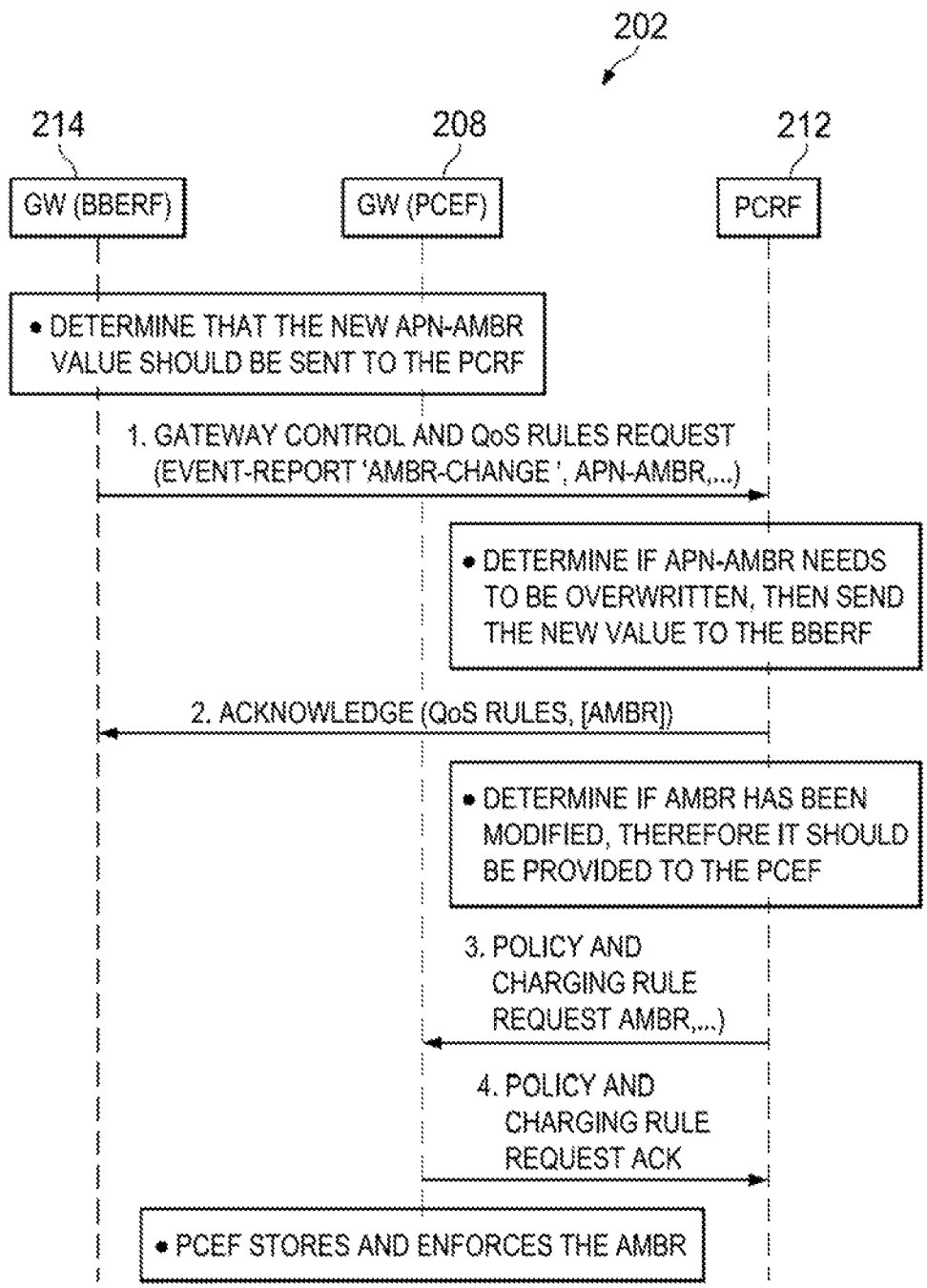
FIG. 5 is an information flow diagram which illustrates an IP-CAN session modification process (BBERF-initiated without BBERF relocation) that has been enhanced to include the APN-AMBR subscription data in accordance with an embodiment of the present invention.

Referring to FIG. 5, there is an information flow diagram which illustrates the IP-CAN session modification process (BBERF 214 initiated without BBERF relocation) that has been enhanced to include the APN-AMBR subscription data in accordance with an embodiment of the present invention. The information flow includes the following steps.

1. BBERF 214 detects that the APN-AMBR has been changed and that the AMBR event trigger is armed. The BBERF 214 sends a Gateway Control and QoS Rules Request including the event-report 'APN-AMBR-change' and the APN-AMBR to the PCRF 212.

2. PCRF 212 determines whether the APN-AMBR needs to be modified (overwritten). If yes, the PCRF 212 sends an Acknowledge including QoS rules and the modified APN-AMBR to the BBERF 214.

3. PCRF 212 determines if the AMBR has been modified and if yes then the modified AMBR should be provided to the PCEF 208. The PCRF 212 sends a Policy and Charging Rule Request including the new AMBR value to the PCEF 208.

4. PCEF 208 sends a Policy and Charging Rule Request Acknowledge to the PCRF 212. PCEF 208 stores and enforces the modified AMBR.

Note: The PCEF-initiated IP-CAN session modification would be similar in that the PCRF 212 provisions the modified AMBR subscription data to the PCEF 208.

The PCEF 208 receives and stores the updated AMBR value after the successful IP-CAN session modification (PCEF or BBERF-initiated without BBERF relocation) due to APN-AMBR-change event trigger. An IP-CAN session modification without BBERF relocation information flow relates to a situation where the BBERF 214 does not change during the lifetime of an IP-CAN session but another event is met in the BBERF 214 that triggers the interaction with the PCRF 212. In contrast, an IP-CAN session modification with BBERF relocation information flow relates to a situation where the BBERF 214 changes during the lifetime of an IP-CAN session (e.g., a handover procedure may change the BBERF 214). In this case, the PCRF 212 would still provision the modified AMBR subscription data to the PCEF 208.

Figure 6:
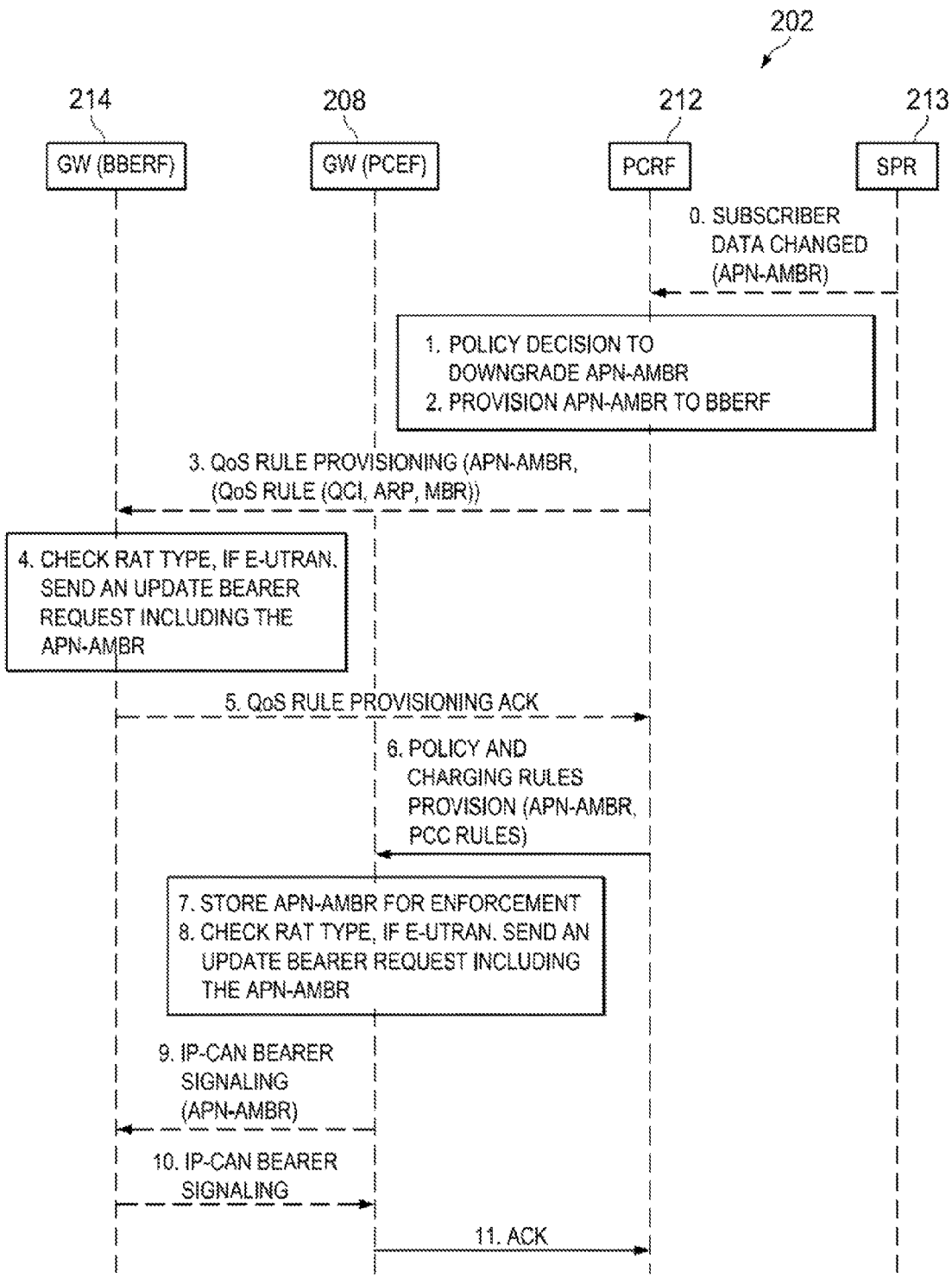
FIG. 6 is an information flow diagram which illustrates a PCRF-initiated AMBR modification due to a PCRF trigger in accordance with an embodiment of the present invention.

Referring to FIG. 6, there is an information flow diagram which illustrates a PCRF-initiated AMBR modification due to a PCRF trigger in accordance with an embodiment of the present invention. In this scenario, assume the PCRF 212 downgrades the AMBR when the trigger is reached (e.g. total consumed volume exceeds a threshold) and upgrades the AMBR back to the subscribed value when the trigger is reset (e.g. at the end of the calendar time, the volume limit is reset). The information flow includes the following steps.

1. PCRF 212 determines that the AMBR needs to be downgraded based on internal policies or some external trigger (e.g., from the SPR 213 which is shown as step 0 in the information flow diagram).

2. PCRF 212 checks if there is a Gxx session already established for that subscriber's UE 206 to determine if the modified APN-AMBR should be sent to the BBERF 214. If yes, then steps 3 to 5 apply.

3. PCRF 212 sends a QoS Rules Provisioning signal to install the modified APN-AMBR into the BBERF 214 for enforcement. The PCRF 212 also uses the QoS Rules Provisioning signal to provision the modified QoS Rules to the BBERF 214. Furthermore, the QoS Rules may include the MBR and the associated QCI and ARP. If according to the IP-CAN Type and RAT Type, the PCRF 212 deduces that the telecommunications network 200 and 400 supports APN-AMBR, it will send that information as well to the BBERF 214. Alternatively, if the network 200 and 400 does not support APN-AMBR, then the PCRF 212 provides the AMBR to the PCEF 208. In this second case, the PCRF 212 includes the modified MBR within the QoS Rule(s) for services with a no resource reservation requirement.

4. BBERF 214 stores the modified APN-AMBR. The BBERF 214 checks the IP-CAN type and RAT-type and if it indicates E-UTRAN, then the BBERF 214 may need to initiate an Update Bearer Request procedure and send the downgraded APN-AMBR. Otherwise, if applicable depending on the kind of IP-CAN, the BBERF 214 may initiate/update the bearers according to the received MBR values included in the QoS rules.

5. BBERF 214 sends a QoS Rule Provisioning Acknowledgement to inform the PCRF 212 about the outcome of the operation.

6. PCRF 212 uses a Policy and Charging Rules Provision signal to provision both the modified AMBR and the modified PCC-Rules to the PCEF 208. In the second case, the PCRF 212 would include the modified MBR within the PCC Rules for services with no resource reservation requirement.

7. PCEF 208 stores the received AMBR information for enforcement.

8. If a PMIP case is supported between the BBERF 214 and the PCEF 208 and/or when the RAT type is different than E-UTRAN, then the PCEF 208 will not take any action towards the access network. However, if GTP is supported and the RAT type indicates E-UTRAN, then steps 9 and 10 apply.

9. PCEF 208 may initiate an Update Bearer Request procedure towards the BBERF 214. In particular, the PCEF 208 may send IP-CAN Bearer Signaling including the downgraded APN-AMBR to the BBERF 214.

10. BBERF 214 responds back to the PCEF 208 by sending IP-CAN Bearer Signaling which includes the result of the operation.

11. PCEF 208 sends an Acknowledgment to notify the PCRF 212 about the outcome of the operation.

Figure 7:
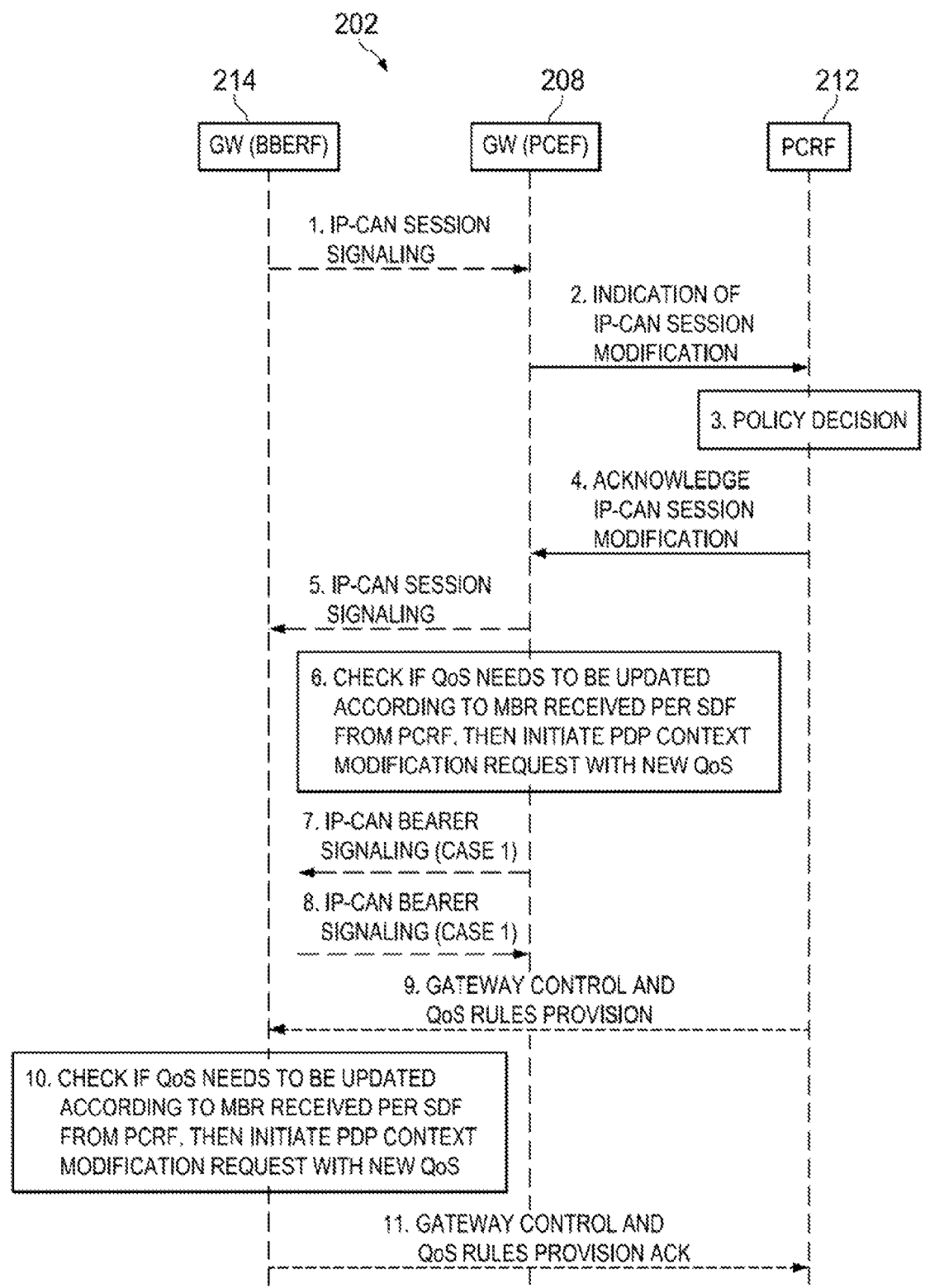
FIG. 7 is an information flow diagram which illustrates a PCEF-initiated IP-CAN session modification in accordance with an embodiment of the present invention.

Referring to FIG. 7, there is an information flow diagram which illustrates a PCEF-initiated IP-CAN session modification in accordance with an embodiment of the present invention. The information flow shows the case where the subscriber's UE 206 is roaming from a 3GPP network with E-UTRAN access where the AMBR concept is supported to a network where the AMBR concept is not supported. The information flow includes the following steps.

1. BBERF 214 may send IP-CAN session signaling to the PCEF 208.

2. PCEF 208 signals the PCRF 212 to initiate the IP-CAN Session Modification Procedure where the signal includes the Event Trigger (i.e. IP-CAN type change and/or RAT type change) together with the applicable information (i.e. IP-CAN type and/or RAT type).

3. PCRF 212 makes a policy decision based on the received information. As a consequence, the PCRF 212 may add, modify or remove PCC rules. In this scenario, the new access does not support the APN-AMBR, thus the PCRF 212 will need to obtain the AMBR.

4. PCRF 212 sends the PCEF 208 an IP-CAN session modification acknowledgment which includes the modified PCC rules and the AMBR that is to be installed in the PCEF 208.

5. PCEF 208 acknowledges the IP-CAN Session signaling received in step 1 by sending IP-CAN session signaling to the BBERF 214. PCEF 208 stores the AMBR locally for enforcement.

6. PCEF 208 binds received PCC Rules to existing bearers with the same QoS requirements that where received within the PCC Rule. If the PCC Rules are bound to a bearer and the bearer QoS has changed then steps 7-8 apply. In particular, PCEF 208 checks if QoS needs to be updated according to MBR received from PCRF 212 per the SDF. If yes, then the PCEF 208 initiates a PDP context modification request with the new QoS (step 7).

7. PCEF 208 initiates a Bearer Modification request procedure with the updated APN-AMBR.

8. PCEF 208 is notified from the network (e.g S-GW 215 or SGSN 209) about the outcome of the bearer modification procedure.

9. If Gxx is supported, PCRF 212 provides the new or modified QoS rules to the BBERF 214. For QoS rules which correspond to services with no resource reservation requirement, the PCRF 212 will also provide the authorized MBR to the BBERF 214.

10. BBERF 214 checks if the QoS has changed. If APN-AMBR is not supported, then the BBERF 214 will create or modify the bearers with no resource reservation requirement according to the MBR received as part of the QoS rules. The BBERF 214 may include the MBR per SDF in a bearer modification request.

11. BBERF 214 sends an acknowledgement signal with the result of the operation to the PCRF 212.

In view of the foregoing, one skilled in the art will readily appreciate that the PCC architecture 202 enables the handling of APN-AMBR subscription data that is associated with a subscriber 204 regardless if the subscriber's UE 206 is located in an AMBR capable access (i.e., E-UTRAN) or in an AMBR non-capable access (i.e., 3G SGSN). The PCC architecture 202 includes the IP level convergence point 208 (e.g., PCEF 208), the policy server 212 (e.g., PCRF 212), the SPR 213 and possibly the BBERF 214. The IP level convergence point 208 includes: (a) a processor 240; and (b) a memory 242 that stores processor-executable instructions where the processor 240 interfaces with the memory 242 and executes the processor-executable instructions to: (1) install the APN-AMBR subscription data during an IP session establishment for the subscriber (in fact the APN-AMBR can be installed whenever the subscriber's UE 206 attaches to the network 200 and 400 regardless of the access type); and (2) enforce the APN-AMBR subscription data for a lifetime of an IP session associated with the IP session establishment. The policy server 212 (e.g., PCRF 212) includes: (a) a processor 244; and (b) a memory 246 that stores processor-executable instructions where the processor 244 interfaces with the memory 246 and executes the processor-executable instructions to be: (1) notified when there is an event trigger that indicates a change in the APN-AMBR subscription data associated with the subscriber 204; and (2) when notified about the change in the APN-AMBR subscription data utilize PCC signaling to send modified APN-AMBR subscription data to the IP level convergence point 208. The PCC architecture 202 has at least the following benefits:

1. The present solution provides a PCC based solution to control AMBR for accesses not supporting AMBR concept.

2. The present solution allows for the dynamically adapting of the AMBR for a subscriber 204 based on specific policies that apply to the IP-CAN session (e.g. calendar, spent volume, etc.).

3. The present solution allows the operator to adapt the maximum bandwidth assigned on per service basis, based on the authorized APN-AMBR.

Although several embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. A policy and charging control, PCC, architecture for handling Access Point Name-Aggregate Maximum Bit Rate, APN-AMBR, subscription data associated with a subscriber regardless if the subscriber's user equipment is in an AMBR capable access or in an AMBR non-capable access, the PCC architecture comprising:
    an Internet Protocol, IP, level convergence point that installs the APN-AMBR subscription data during an IP session establishment for the subscriber, where the IP level convergence point enforces the APN-AMBR subscription data for a lifetime of an IP session associated with the IP session establishment; and
    a policy server, coupled to the IP level convergence point, where during the IP session establishment the policy server subscribes to be notified when there is an event trigger that indicates a change in the APN-AMBR subscription data associated with the subscriber.

2. The PCC architecture of claim 1, wherein the event trigger is initiated when a subscriber database initiates an APN-AMBR change.

3. The PCC architecture of claim 1, wherein the policy server retrieves APN-AMBR subscription from a subscriber data base when the subscriber's user equipment moves to the non-AMBR capable access.

4. The PCC architecture of claim 1, wherein the IP level convergence point detects the event trigger and initiates an IP session modification during which the policy server is notified about the change in the APN-AMBR subscription data and the policy server then utilizes policy and charging control, PCC, signaling to send modified APN-AMBR subscription data to the IP level convergence point which stores and enforces the modified APN-AMBR subscription data.

5. The PCC architecture of claim 1, wherein a bearer binding and event reporting function, BBERF, detects the event trigger and initiates an IP session modification during which the policy server is notified about the change in the APN-AMBR subscription data and the policy server then uses policy and charging control, PCC, signaling to send modified APN-AMBR subscription data to the IP level convergence point which stores and enforces the modified APN-AMBR subscription data.

6. The PCC architecture of claim 1, wherein the policy server detects the event trigger and initiates an IP session modification during which the policy server uses policy and charging control, PCC, signaling to send modified APN-AMBR subscription data to the IP level convergence point which then stores and enforces the modified APN-AMBR subscription data.

7. The PCC architecture of claim 1, wherein the policy server detects that a volume or a time limit according to the APN-AMBR subscription data has been reached then initiates an IP session modification during which the policy server uses policy and charging control, PCC, signaling to send modified APN-AMBR subscription data to the IP level convergence point which then stores and enforces the modified APN-AMBR subscription data.

8. The PCC architecture of claim 1, wherein the IP level convergence point detects the event trigger and initiates an IP session modification during which the policy server is notified about the change causing the event trigger and then the policy server makes a policy decision and sends policy and charging control, PCC, rules to the IP level convergence point.

9. The PCC architecture of claim 1, wherein:
   the IP level convergence point is a policy and charging enforcement function; and
   the policy server is a policy and charging rules function.

10. A method for handling Access Point Name-Aggregate Maximum Bit Rate, APN-AMBR, subscription data associated with a subscriber regardless if the subscriber's user equipment is located in an AMBR capable access or in an AMBR non-capable access, the method comprising:
   installing the APN-AMBR subscription data in an Internet Protocol, IP, level convergence point during an IP session establishment for the subscriber;
   enforcing the APN-AMBR subscription from the IP level convergence point for a lifetime of an IP session associated with the IP session establishment; and
   subscribing by a policy server to be notified when there is an event trigger that indicates a change in the APN-AMBR subscription data associated with the subscriber.

11. The method of claim 10, wherein the event trigger is initiated when a subscriber database initiates an APN-AMBR change.

12. The method of claim 10, further comprising the steps of:
   detecting the event trigger at the IP level convergence point;
   initiating an IP session modification from the IP level convergence point to notify the policy server about the change in the APN-AMBR subscription data;
   utilizing policy and charging control, PCC, signaling to send modified APN-AMBR subscription data from the policy server to the IP level convergence point;
   storing the modified APN-AMBR subscription data at the IP level convergence point; and
   enforcing the modified APN-AMBR subscription data at the IP level convergence point.

13. The method of claim 10, further comprising the steps of:
   detecting the event trigger at a bearer binding and event reporting function, BBERF;
   initiating an IP session modification from the BBERF to notify the policy server about the change in the APN-AMBR subscription data;
   utilizing policy and charging control, PCC, signaling to send modified APN-AMBR subscription data from the policy server to the IP level convergence point;
   storing the modified APN-AMBR subscription data at the IP level convergence point; and
   enforcing the modified APN-AMBR subscription data at the IP level convergence point.

14. The method of claim 10, further comprising the steps of:
   detecting the event trigger at the policy server;
   initiating an IP session modification from the policy server;
   utilizing policy and charging control, PCC, signaling to send modified APN-AMBR subscription data from the policy server to the IP level convergence point;
   storing the modified APN-AMBR subscription data at the IP level convergence point; and
   enforcing the modified APN-AMBR subscription data at the IP level convergence point.

15. The method of claim 10, further comprising the steps of:
   detecting the event trigger at the IP level convergence point;
   initiating an IP session modification from the IP level convergence point to notify the policy server about a change causing the event trigger;
   making a policy decision at the policy server; and
   sending policy and charging control, PCC, rules from the policy server to the IP level convergence point.

16. The method of claim 10, wherein:
   the IP level convergence point is a policy and charging enforcement function; and
   the policy server is a policy and charging rules function.

17. A telecommunications network for handling Access Point Name-Aggregate Maximum Bit Rate, APN-AMBR, subscription data associated with a subscriber regardless if the subscriber's user equipment is located in an AMBR capable access or in an AMBR non-capable access, the telecommunications network comprising:
   a bearer binding and event reporting function, BBERF;
   an Internet Protocol, IP, level convergence point that installs the APN-AMBR subscription data during an IP session establishment for the subscriber, where the IP level convergence point enforces the APN-AMBR subscription data for a lifetime of an IP session associated with the IP session establishment; and
   a policy server, coupled to the IP level convergence point, where during the IP session establishment the policy server subscribes to be notified by at least the BBERF and the IP level convergence point when there is an event trigger that indicates a change in the APN-AMBR subscription data associated with the subscriber, and when notified about the event trigger utilizes policy and charging control, PCC, signaling to send modified APN-AMBR subscription data to the IP level convergence point.

18. The telecommunications network of claim 17, wherein the policy server detects that the subscriber's user equipment attaches or moves to an access that does not supporting AMBR and then retrieves the AMBR from a database and then installs the retired AMBR in the IP level convergence point.

19. An Internet Protocol, IP, level convergence point that interacts with at least a policy server to handle Access Point Name-Aggregate Maximum Bit Rate, APN-AMBR, subscription data associated with a subscriber regardless if the subscriber's user equipment is located in an AMBR capable access or in an AMBR non-capable access, the IP level convergence point comprising:
   a processor; and
   a memory that stores processor-executable instructions where the processor interfaces with the memory and executes the processor-executable instructions to: (1) install the APN-AMBR subscription data during an IP session establishment for the subscriber; and (2) enforce the APN-AMBR subscription data for a lifetime of an IP session associated with the IP session establishment.

20. A policy server that interacts with at least an IP level convergence point and a Subscriber Profile Repository, SPR, to handle Access Point Name-Aggregate Maximum Bit Rate, APN-AMBR, subscription data associated with a subscriber regardless if the subscriber's user equipment is located in an APN-AMBR capable access or in an APN-AMBR non-capable access, the policy server comprising:
   a processor; and
   a memory that stores processor-executable instructions where the processor interfaces with the memory and executes the processor-executable instructions to: (1) subscribe to be notified when there is an event trigger that indicates a change in the APN-AMBR subscription data associated with the subscriber; and (2) when notified about the change in the APN-AMBR subscription data utilize policy and charging control, PCC, signaling to send modified APN-AMBR subscription data to the IP level convergence point.

* * * * *